United States Patent Office 2,957,842
Patented Oct. 25, 1960

2,957,842

COMPOSITION COMPRISING A VINYL CHLORIDE POLYMER PLASTICIZED WITH A MIXTURE OF CHLORINATED N,N - DIALKYLSTEARAMIDES

Joachim Dazzi, Dayton, Ohio, assignor to Monsanto Chemical Company, St. Louis, Mo., a corporation of Delaware No Drawing. Original application Jan. 25, 1954, Ser. No. 406,070. Divided and this application May 8, 1958, Ser. No. 733,839

4 Claims. (Cl. 260—32.6)

The present invention relates to resinous compositions, and more particularly provides vinyl chloride polymers plasticized with chlorine-substituted N,N-dialkylstearamides having from two to four chlorine atoms in the fatty acid portion of the molecule, and having from 1 to 5 carbon atoms in each N-alkyl radical.

The presently useful chloro compounds are readily obtainable by passing elemental chlorine into an amide selected from the class consisting of an N,N,-dialkyloleamide having from 1 to 5 carbon atoms in the alkyl radical, an N,N-dialkyllinoleamide having from 1 to 5 carbon atoms in the alkyl radical, and technical mixtures of said amides. Reaction of the chlorine with said amides takes place readily by primary addition of two atoms of chlorine at the olefinic double bonds of the N.N-dialkyloleamide or the N,N-dialkyllinoleamide. Thus, reaction of the oleamide with two atoms of chlorine gives the N,N-dialkyl-9,10-dichlorostearamide, and reaction of linoleamide with four atoms of chlorine gives the N,N-dialkyl-9,10,12,13-tetrachlorostearamide. Even though the N,N-dialkyloleamide or the N,N-dialkyllinoleamide is contacted with more than enough moles of chlorine for saturation of the olefinic double bonds, substantially no substitution of chlorine for hydrogen takes place at ordinary or moderately increased temperatures, i.e., at temperatures of, say, below 100° C. At higher temperatures, introduction of chlorine in excess of that stoichiometrically required for saturation of the olefinic double bonds of the amides will result in replacement by chlorine of the hydrogen atoms of the initially formed N,N-dialkyldichlorostearamides or the N,N-dialkyltetrachlorostearamides.

Examples of the presently useful chlorine—addition compounds are N,N-dimethyl-, N,N-diethyl-, N,N-di-n-propyl-, N,N-diisobutyl-, or N,N-di-n-amyldichlorostearamide prepared by passing elemental chlorine into N,N-dimethyl-, N,N-diethyl-, N,N-di-n-propyl-, N,N-diisobutyl-, or N,N-di-n-amyloleamide, respectively, or the corresponding N-dialkylated tetrachlorostearamides, e.g., N,N-dimethyl-, N,N-diisopropyl-, or N,N-di-tert-amyl-tetrachlorostearamide, prepared by passing chlorine into N,N-dimethyl- N,N-diisopropyl-, or N,N-di-tert-amyl-linoleamide, respectively. The N,N-dialkyloleamides or the N,N-dialkyllinoleamides are readily obtainable compounds prepared in known manner, by condensation of oleic or linoleic acid or the acid halides thereof with an appropriate dialkylamine, e.g., dimethylamine, dibutylamine or diamylamine. Particularly valuable for the present purposes are technical mixtures containing a predominant proportion of the N,N-dialkylamides of a mixture of oleic acid and linoleic acid, e.g., the unsaturated higher fatty acids derived from tall oil.

The addition reaction takes place readily at decreased, ordinary or moderately increased temperatures, say at temperatures of from 0° C. to 100° C. and in the presence or absence of catalysts. Inasmuch as the reaction is exothermal, extraneous heating is generally unnecessary; on the other hand, the heat evolved in the addition reaction is of so low an order that usually no precaution need be employed for dissipating exothermal heat. Catalysts which may be employed are metals, metal oxides and metallic salts such as iron, aluminum, iron oxides, cupric, ferric or calcium chloride, etc. Light accelerates addition of chlorine to the olefinic double bonds of the N,N-dialkyloleamide or N,N-dialkyllinoleamide. Hence, the halogenation is advantageously carried out in daylight or by use of an ultra-violet light source. The photochlorination may be further accelerated by using the above-mentioned catalysts. As hereinbefore stated, however, the addition of chlorine to the olefinic double bonds takes place so easily that neither light or catalyst need be employed in effecting saturation of the double bond. Irrespective of the quantity of chlorine with which the N,N-dialkyloleamide or the N,N-dialkyllinoleamide is contacted, within the lower temperature range, i.e., at a temperature of from say, 0° C. to 100° C., from these reactants there are formed predominantly the N,N-dialkyldichlorostearamides or the N,N-dialkyltetrachlorostearamides respectively. The higher chlorinated products, i.e., compounds formed by both addition and substitution result when there are used both the higher temperatures and quantities of chlorine greater than required stoichiometrically to saturate the olefinic double bonds.

The presently useful chloro-substituted N,N-dialkylstearamides may also be prepared by chlorinating oleic acid, linoleic acid or technical mixtures thereof to give dichloro- and/or tetrachlorostearic acid, and condensing said chlorostearic acid with a dialkylamine having from 1 to 5 carbon atoms in the alkyl radical.

The presently employed chlorine-substituted N,N-dialkylstearamides are completely compatible with vinyl chloride polymers and show no exudation of plasticizer even at plasticizer content of up to 50 percent. Although the quantity of plasticizer will depend upon the particular polymer to be plasticized and upon its molecular weight, it is generally found that compositions having from 5 percent to 50 percent by weight of plasticizer will, in most cases, be satisfactory for generally utility. The good flexibility of the plasticized compositions increases with increasing plasticizer concentration.

In evaluating plasticizer efficiency, use is made of the following empirical testing procedures:

*Compatibility.*—Visual inspection of the plasticized composition is employed, incompatibility of the plasticizer with the polymer being demonstrated by cloudiness and exudation of the plasticizer.

*Hardness.*—A standard instrument made by the Shore Instrument Company is used for this determination and expresses the hardness in units from one to 100. The hardness of the composition is judged by its resistance to the penetration of a standard needle applied to the composition under a standard road for a standard length of time.

*Low temperature flexibility.*—Low temperature flexibility is one of the most important properties of elastomeric vinyl compositions. While many plasticizers will produce flexible compositions at room temperature the flexibility of these compositions at low temperatures may vary considerably, i.e., plasticized polyvinyl chloride compositions that are flexible at room temperature often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the low temperature flexibility of the composition. This value may also be defined as the lower temperature limit of the plasticized compositions' usefulness as an elastomer.

*Volatility.*—Just as a decrease in temperature often results in decreased flexibility of a plasticized polymer composition so does a decrease in plasticizer concentration when caused by volatilization of the plasticizer. Hence, plasticizers which are readily volatilized from the plasticized composition as a result of aging or heating are inefficient because upon volatilization the plasticized composition becomes stiff and hard. The test for plasticizer volatility herein employed is a modified carbon-absorption test of the Society of Plastics Industry.

*Water resistance.*—The amount of water absorption and the amount of leaching that takes place when the plasticized composition is immersed in distilled water for 24 hours is determined.

The invention is further illustrated, but not limited, by the following examples:

Example 1

There was charged to a reaction vessel equipped with a stirrer and provided with gas inlet tube, 154.5 g. (0.5 mole) of the N,N-dimethyl amide of a mixture of higher aliphatic monocarboxylic acids known to the trade as Acintol FA No. 2. This mixture of fatty acids is reputed to consist 50 percent by weight of oleic acid, 48 percent by weight of linoleic acid and 2 percent by weight of saturated acids. The N,N-dimethylamide of the Acintol was prepared in known manner by condensation with dimethylamine.

The charge of amide was exposed to ultra-violet radiation and 60 g. of dry chlorine was gradually led into the amide, with constant stirring. During the chlorine addition, an exothermal temperature of from 40–50° C. was noted. When all of the chlorine had been introduced, the reaction vessel was purged with nitrogen. Because the reaction mixture had become quite viscous, it was then diluted with ether and the diluted material water-washed until neutral. The resulting organic layer was dried and heated to a temperature of 150° C./1 mm. to drive off the solvent. There was thus obtained as residue 198 g. of the chlorinated dimethylamide, $n_D^{25}$ 1.4910, analyzing 1.05 percent free acid, calculated as oleic acid, 23.93 percent chlorine and 2.99 percent nitrogen. The chlorinated material contains 2.7 atoms of chlorine per mole of product and is thus a mixture consisting approximately one-half of N,N-dimethyl-9,10-dichlorostearamide and one-half of N,N-dimethyl-9,10,12,13-tetrachlorostearamide.

Example 2

Sixty parts of polyvinyl chloride and 40 parts by weight of the chlorinated dimethylamide of Example 1 were mixed on a rolling mill to a homogeneous blend. During the milling there was observed substantially no fuming or discoloration. A molded sheet of the mixture was clear and transparent and substantially colorless. Testing of the molded sheet for low temperature flexibility, according to the testing procedure described above, gave a value of minus 17.4° C., which value denotes very good low temperature properties. Tests on the volatility characteristics of the plasticized composition gave a value of 1.7 percent which shows very good retention of plasticizer and indicated good temperature characteristics of the composition. When subjected to heat at a temperature of 325° F. for a period of 30 minutes the clarity and color of the molded product was substantially unchanged. Tests of the water-resistance of the plasticized material showed a solids loss of only 0.04 percent and a water absorption value of 0.90 percent.

While the above example shows only a composition in which the ratio of plasticizer to polymer content is 40:60, this ratio being employed in order to get comparable efficiencies, the content of chlorinated amide may be widely varied depending upon the properties desired in the final product. For many purposes a plasticizer content of, say, from only 10 percent to 20 percent is preferred. The present chloro dialkylamides are compatible with polyvinyl chloride over a wide range of concentration, up to 50 percent of amides based on the total weight of the plasticized composition yielding desirable products.

Although the invention has been described particularly with reference to the use of the present amides as plasticizers for polyvinyl chloride, these compounds are advantageously employed also as plasticizers for copolymers of vinyl chloride, for example, the copolymers of vinyl chloride with vinyl acetate or vinylidene chloride. Preferably, such copolymers have a high vinyl chloride content, i.e., a vinyl chloride content of at least 70 percent by weight of vinyl chloride and up to 30 percent by weight of the copolymerizable monomer.

The plasticized polyvinyl halide compositions of the present invention have good thermal stability; in some instances the present chloro—amides impart flame-resistance to vinyl chloride polymers. The chlorine-substituted N,N-dialkylstearamides are of general utility in softening vinyl chloride polymers. They may be used as the only plasticizing component in a compounded vinyl chloride polymer or they may be used in conjunction with other plasticizers.

This application is a division of my copending application, Serial No. 406,070, filed January 25, 1954, and now abandoned.

What I claim is:

1. A resinous composition comprising a polymeric material selected from the class consisting of polyvinyl chloride and a copolymer of at least 70% by weight of vinyl chloride and up to 30% by weight of vinyl acetate, said polymeric material being plasticized with from 5 to 50% by weight, based on the weight of the resinous composition, of a mixture of chlorine-substituted N,N-dialkylstearamides prepared by the chlorination of an N,N-dialkylamide of tall oil fatty acid fraction having from 1 to 5 carbon atoms in each alkyl radical and consisting essentially of an N,N-dialkyl-9,10-dichlorostearamide and an N,N-dialkyl-9,10,12,13-tetrachlorostearamide wherein each alkyl radical is as herein defined.

2. A resinous composition comprising polyvinyl chloride plasticized with from 5 to 50% by weight, based on the weight of the resinous composition, of a mixture of chlorine-substituted N,N-dialkylstearamides prepared by the chlorination of an N,N-dialkyl amide of tall oil fatty acid fraction having from 1 to 5 carbon atoms in each alkyl radical and consisting essentially of an N,N-dialkyl-9,10-dichlorostearamide and an N,N-dialkyl-9,10,12,13-tetrachlorostearamide wherein each alkyl radical is as herein defined.

3. A resinous composition comprising a copolymer of at least 70% by weight of vinyl chloride and up to 30% by weight of vinyl acetate, said copolymer being plasticized with from 5 to 50% by weight, based on the weight of the resinous composition, of a mixture of chlorine-substituted N,N-dialkylstearamides prepared by the chlorination of an N,N-dialkyl amide of tall oil fatty acid fraction having from 1 to 5 carbon atoms in each alkyl radical and consisting essentially of an N,N-dialkyl-9,10-dichlorostearamide and an N,N-dialkyl-9,10,12,13-tetrachlorostearamide wherein each alkyl radical is as herein defined.

4. A resinous composition comprising polyvinyl chloride plasticized with from 5 to 50% by weight, based on the weight of the resinous composition of a mixture of chloroamides prepared by the chlorination of the N,N-dimethylamide of tall oil fatty acid fraction and consisting essentially of N,N-dimethyl-9,10-dichlorostearamide and N,N-dimethyl-9,10,12,13-tetrachlorostearamide.

No references cited.